United States Patent [19]

Williams

[11] Patent Number: 5,514,402

[45] Date of Patent: May 7, 1996

[54] APPARATUS AND METHOD FOR MAKING PIZZA

[76] Inventor: Preston N. Williams, 838 Greer St., Indianapolis, Ind. 46203

[21] Appl. No.: 402,647

[22] Filed: Mar. 13, 1995

[51] Int. Cl.[6] ............................. A21B 3/13; A21D 8/00
[52] U.S. Cl. ......................... 426/496; 426/512; 426/514; 426/523; 99/422; 99/439
[58] Field of Search .................................. 426/512, 514, 426/525; 99/432, 439, 496

[56] References Cited

U.S. PATENT DOCUMENTS

| | | | |
|---|---|---|---|
| 1,596,331 | 8/1926 | Bassett | 99/439 |
| 3,196,777 | 7/1965 | Luker | 99/439 |
| 4,649,053 | 3/1987 | Lamonica | 99/432 |
| 5,226,352 | 7/1993 | Savage | 99/439 |

*Primary Examiner*—Helen Pratt
*Attorney, Agent, or Firm*—Clayton R. Johnson

[57] ABSTRACT

A secondary pan is positionable in a main pan in centered relationship to the main pan on top of pizza dough in the main pan to provide raised radial inner and outer peripheral dough rims of greater thickness than the central part of the pizza dough and radial inner and outer peripheral edges for decreasing the time required to bake the dough. After removing the secondary pan from the main pan, pizza topping is placed on the annular central portion of the dough or baked pizza crust and baked. Each of the pans has an inner and an outer frustoconical wall with the lower base edge of the respective wall being joined to the respective inner and outer base edge of the base of the respective pan. The minor base edges of the outer peripheral walls are joined to the respective base while the major base edges of the inner peripheral walls are joined to the respective base.

11 Claims, 1 Drawing Sheet

APPARATUS AND METHOD FOR MAKING PIZZA

BACKGROUND OF THE INVENTION

This invention relates to apparatus for making pizza and a method of making pizza using such apparatus.

Conventional pizzas known to applicant have only a single peripheral edge regardless of the shape of the pizza in plan view. When pizza bakes, it primarily bakes from the edge toward the center because the hot air rising in the oven passes adjacent to the peripheral edge of the pizza and can not pass through the center. As a result, primarily the peripheral edge portion is baked first and then the heat slowly moves toward the center of the pizza dough. Accordingly, until the center is done, the pizza is not done.

In order to overcome problems such as the above and to provide an improved method of making pizza and devices for making pizza, this invention has been made.

SUMMARY OF THE INVENTION

A) THICK CRUST PIZZA

The pizza dough is placed in a main pan having a frustoconical central (inner peripheral) wall opening through the center of the dough and an outer frustoconical peripheral wall so that the dough has a radial inner peripheral edge and a radial outer peripheral edge. A second pan having a central frustoconical (inner peripheral) wall of larger diameters than the main pan central wall and an outer frustoconical wall of smaller diameters than the main pan frustoconical wall is provided for being positioned within the main pan and on top of the dough in the main pan in centered relationship to the main pan to shape the dough such that the dough has radial inner and outer rims of greater maximum heights than the central annular portion of the dough and the dough central annular portion intermediate the rims is of a substantially constant depth. Now the dough in the main pan, with or without the second pan thereon, may be pre-baked in an oven to form a pizza crust (pre-baked dough), the provision of dough inner and outer peripheral edges decreasing the time required for baking the pizza. Thereafter, the pre-baked dough is removed and the desired topping is applied to the pre-baked dough. Thence the now pre-baked dough and topping, with or without being in the main pan, are placed in an oven for baking the pizza. Alternately, after the dough is formed in the main pan and the second pan removed, and prior to any baking, topping is placed on the dough and then the dough and topping in the main pan are baked in the oven.

B) THIN CRUST PIZZA

For thin crust pizzas, one obtains the pre-baked dough per the above procedures except that the dough that is pre-baked is thinner than the dough for making thick crust pizzas and the thin pre-baked crust with topping may be then baked or otherwise heated without using either of the pans. This allows for uniform cripness throughout the pizza, which is most desired by many fanciers of thin crust pizza.

DESCRIPTION OF THE PREFERRED EMBODIMENT

Figure 1:
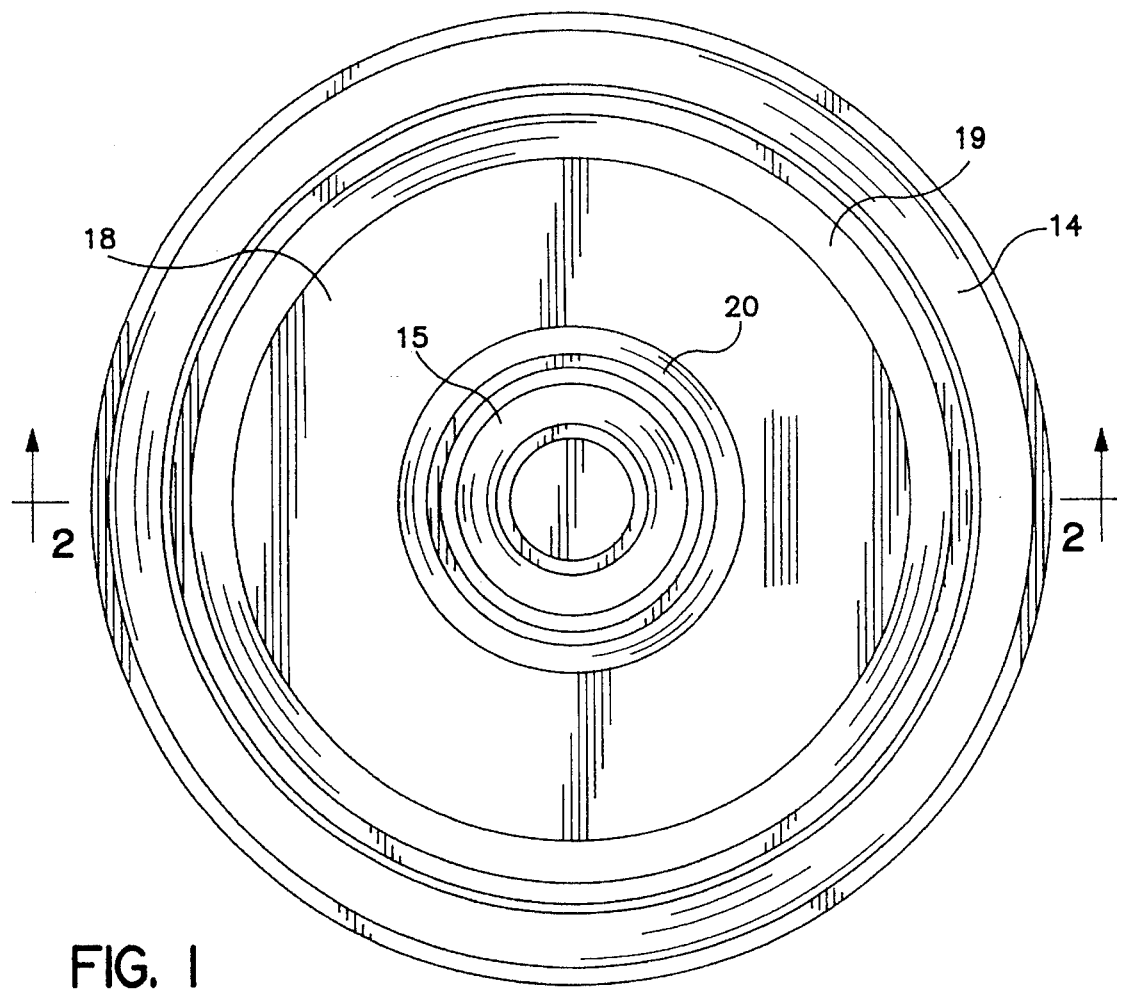
FIG. 1 is a plan view taken along the line and in the direction of the arrows 1—1 of FIG. 2 with the second pan centered in the main pan in a position of use.
Figure 2:
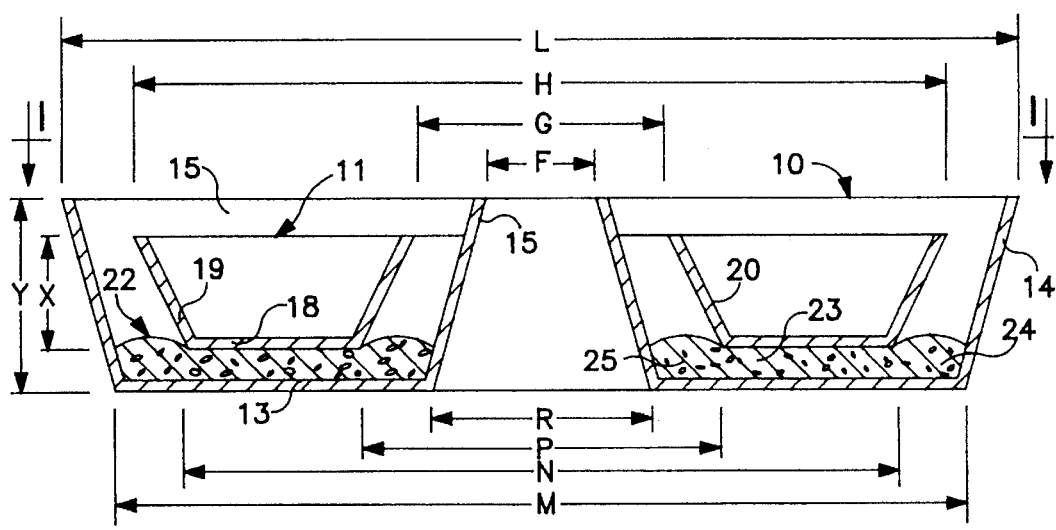
FIG. 2 is a cross sectional view taken along the line and in the direction of the arrows 2—2 of FIG. 1.

Referring to the drawings, there is shown a main pizza pan, generally designated 10 having an annular, planar base 13, a frustoconical outer wall 14 having a minor base edge joined to the outer peripheral edge of the base 13 and a frustoconical central inner wall 15 having a major base edge joined to the base. Thus, each of the frustoconical outer and inner walls 14 and 15 has a top peripheral edge and a lower peripheral edge joined to the outer peripheral edge and an inner peripheral edge respectively of the base 13 to extend vertically above the base.

A secondary pan, generally designated 11, has a planar annular base 18, a frustoconical outer wall 19 having a lower minor base edge joined to the outer peripheral edge of the base 18 and a frustoconical central inner wall 20 having a major base edge joined to the inner peripheral edge of the base 18 to extend vertically above the base. Thus, each of the frustoconical outer and inner walls 19 and 20 has a top peripheral edge and a bottom peripheral edge with the lower minor base peripheral edge of the outer wall joined to the base outer peripheral edge and a lower major base edge of the inner peripheral wall joined to the base inner peripheral edge of the base 18 to extend vertically above the base.

The outer diameter M of the base 13 and the diameter L of the major base of wall 14 are each greater than the diameter H of the major base of outer wall 19 which in turn is substantially greater than the diameter R of inner peripheral edge of base 13 and greater than the diameter N of the lower edge of wall 19. Additionally, the diameter R of the major base of wall 15 is less than the diameter G of the major base of wall 20 while the diameter P of the inner periphery of the base 18 is greater than the diameter G. Further, the diameter G of the minor base of the inner wall 20 is greater than the diameter R of the major base of the inner peripheral wall 15 while the diameter N of outer peripheral edge of base 18 is less than the diameter is less than the diameter M of the outer peripheral edge of the base 20 and the diameter R of the lower edge of wall 15 is less than the diameter G of the upper edge of wall 19. As a result the secondary pan may be placed in the main pan with their base walls in abutting relationship to leave an annular frustoconical space between their outer walls and an annular frustoconical space between their inner peripheral walls. Even though not used is such a manner, the pans may be of relative dimensions such that major base annular edge of the wall 20 and the minor base edge of wall 20 may each abut against the base 13.

Advantageously, the conical angle of the outer peripheral wall of the main pan is about the same as that of the outer peripheral wall of the secondary pan. Additionally, the vertical dimension Y of each of the inner and outer walls of the main pan is substantially greater than that of the inner and outer peripheral walls of the secondary pan. Advantageously, the vertical dimensions of each of the walls of main pan are substantially the same while the vertical dimensions Y of each of the walls of the secondary pan are substantially the same.

In using the apparatus of this invention, the pizza dough, generally designated 22, after having been prepared and proofed, is placed in the main pan and shaped to cover the bottom of the pan, including having peripheral edges abutting against the inner and outer walls. Then the secondary pan is placed in centered relationship on top of the dough in the main pan and depressed or the dough allow to raise such that the central annular portion 23 of the dough (part beneath the secondary pan base and radially centered relative to the inner and outer peripheral edges of the dough) is of a smaller thickness than the dough radial outer peripheral rim portion 24 and the dough radial inner peripheral rim portion 25 such that the rims extend to a higher elevation than the central portion 23. That is, the radial inner and outer rim portions are of a maximum greater thickness than the dough central portion. After the rim portions are above the annular central part of the dough the secondary pan is removed from being in the main pan.

After the secondary pan is removed, the desired topping is placed on the dough central portion. The rim portions served to prevent the topping running over the peripheral edges of the dough. Further, through the use of the secondary pan, the dough central portion is of substantially even thickness throughout its annular area. The main pan with the shaped dough and topping therein are thence baked. Alternately, after the secondary pan is removed, the dough in the main pan may be baked to provide a baked pizza crust, then the crust is frozen or otherwise suitably stored, and at the desired time, the topping applied to the baked pizza crust and thence heated or baked until done. In either event, during the baking in a conventional pizza oven, hot air will rise along both in walls 14, 15 such that dough heats both radially inwardly and radially outwardly toward the annular central part of the dough. The finished pizza will have a central hole extending therethrough. The inner and outer peripheral walls of the main pan being frustoconical with their major and minor bases respectively being at a lower elevation than their main bases facilitate the removal of the finished pizza and/or pizza crust respectively from the main pan.

Due to the provision of the frustoconical wall 15 of the main pan, during baking, hot air passes up along the main pan inner and outer peripheral walls. This increases the total edge dimension to the horizontal area of the pizza, i.e. ratio of edge dimension to pizza area. Thus, more rapid heating takes place with the primary heating proceeding both radially inwardly from the radial outer peripheral edges of the dough in the main pan and radially outwardly from the radial inner edge of the dough than at the radial central portion of the dough in the main pan that is radially intermediate the inner and outer dough peripheral edges. This results in substantially decreasing the time required for baking the pizza dough, with or without the pizza topping thereon, from that of an equal weight of pizza dough with no hole in the center.

As one example of the invention, the outer diameter of the base 13 of the main pan may be about 6½ inches and the inner diameter of the base about 2 inches and the vertical height Y of about 1½ inches; while the outer diameter of the base 18 of the secondary pan may be about 5½ inches and an inner diameter of about 2¼ inches and the vertical height X of about ⅞ inches. Of course it is to be understood that the main and secondary pans may be of different dimensions for making pizzas of varying sizes as long as there are sufficient clearances to provide the inner and outer dough rims and for heat to rise through the center of the pans.

What is claimed is:

1. Apparatus for preparing pizzas, including baking pizza dough, comprising the combination of a main pan and a secondary pan seatable on pizza dough in the main pan, each of the pans including an annular base having an inner peripheral edge and an outer peripheral edge, an inner frustoconical wall having a major base lower edge joined to the inner peripheral edge of the respective annular base to extend thereabove and have an opening extending vertically therethrough, and an outer peripheral wall having a lower peripheral edge joined to the outer peripheral edge of the respective annular base to extend above the respective annular base, the diameter of the secondary pan major base edge being greater than the diameter of the major base edge of the main pan inner frustoconical wall to permit the main pan inner frustoconical wall to extend upwardly in the secondary wall while leaving an annular clearance space therebetween and the dimensions of the main pan outer peripheral wall being sufficiently greater than those of the secondary pan outer peripheral wall to leave a significant annular clearance space therebetween.

2. The apparatus of claim 1 wherein the vertical dimension of the inner peripheral wall of the main pan is greater than that of the inner peripheral wall of the secondary pan and the vertical dimension of the outer peripheral wall of the main pan is substantially greater than that of the outer peripheral wall of the secondary pan.

3. The apparatus of claim 1 wherein each of the main pan outer peripheral wall and secondary pan outer peripheral wall is of a frustoconical shape with the respective wall lower edge being the minor base of respective outer wall.

4. A method of making pizza comprising the steps of placing pizza dough in a main pan having an annular outer peripheral wall and an annular inner peripheral wall defining a hole extending through the pan; shaping the dough to cover the bottom of the pan and abut against the outer and inner peripheral wall respectively to provide radial outer and inner peripheral dough edges and have a hole extending vertically through the shaped dough and baking the shaped dough whereby the provision of the hole in the shaped dough decreases the baking time.

5. The method of claim 4 further characterized in that prior to baking and subsequent to placing pizza dough in the main pan, placing a secondary pan that has an annular inner peripheral wall in the main pan in abutting relationship to the dough and in substantially centered relationship to the main pan to provide a dough annular central portion and radial inner and outer dough rim portions that are of greater maximum vertical thicknesses than that of the central portion.

6. The method of claim 5 wherein, after placing the secondary pan in abutting relationship to the dough, removing the secondary pan from the main pan and then placing pizza topping on the central portion of the dough.

7. The method of claim 6 wherein the step of removing the secondary pan is taken prior to the baking step.

8. The apparatus of claim 1 wherein each of the frustoconical walls has a minor base upper edge, the minor base edge of the secondary pan being of a diameter greater than the diameter of the major base of the main pan.

9. The apparatus of claim 1 wherein each of the frustoconical walls has a minor base upper edge, the secondary dan minor base edge being of a diameter greater than the diameter of the main pan minor base edge.

10. The apparatus of claim 9 wherein the secondary pan inner peripheral edge is of a diameter that is about one-half inch greater than the inner peripheral edge of the main pan.

11. The apparatus of claim 9 wherein the outer peripheral edge of the main pan is of a diameter greater than diameter of the secondary major base edge.

* * * * *